(12) United States Patent
Komatsu

(10) Patent No.: US 11,650,447 B2
(45) Date of Patent: May 16, 2023

(54) LIGHT CONTROL SHEET, LIGHT CONTROL DEVICE AND METHOD OF CONTROLLING THE LIGHT CONTROL SHEET

(71) Applicant: TOPPAN PRINTING CO., LTD., Tokyo (JP)

(72) Inventor: Motoyasu Komatsu, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/477,639

(22) Filed: Sep. 17, 2021

(65) Prior Publication Data

US 2022/0004036 A1 Jan. 6, 2022

Related U.S. Application Data

(63) Continuation of application No. PCT/JP2020/011952, filed on Mar. 18, 2020.

(30) Foreign Application Priority Data

Mar. 19, 2019 (JP) .............................. JP2019-051307

(51) Int. Cl.
  *G02F 1/1334* (2006.01)
  *G02F 1/133* (2006.01)
  *G02F 1/1343* (2006.01)
(52) U.S. Cl.
  CPC ........ *G02F 1/1334* (2013.01); *G02F 1/13318* (2013.01); *G02F 1/13439* (2013.01)

(58) Field of Classification Search
  CPC . G02F 1/1334; G02F 1/13318; G02F 1/13439
  See application file for complete search history.

(56) References Cited

U.S. PATENT DOCUMENTS

| 11,067,809 | B1* | 7/2021 | Sears ................. G02B 27/0081 |
| 2004/0105053 | A1* | 6/2004 | Ozeki ................ G02F 1/13476 349/112 |

(Continued)

FOREIGN PATENT DOCUMENTS

| JP | 2016-109994 A | 6/2016 |
| JP | 2017-187775 A | 10/2017 |

(Continued)

OTHER PUBLICATIONS

WO 2004055578 A1 translation (Year: 2004).*

(Continued)

*Primary Examiner* — James A Dudek
(74) *Attorney, Agent, or Firm* — Oblon, McClelland, Maier & Neustadt, L.L.P.

(57) ABSTRACT

A light control sheet including a light control layer and transparent electrode layers sandwiching the light control layer such that the transparent electrode layers apply a voltage to the light control layer. The light control layer has a light-shielding property which changes based on the voltage applied to the transparent electrode layers and is measurable by a light-shielding ratio defined by JIS L 1055:2009, and at least one target change ratio has a maximum value of 0.7 or more in an absolute value, where the target change ratio is a change ratio of the light-shielding ratio with respect to the voltage in a target range of the voltage in which the light-shielding ratio changes by 10%.

20 Claims, 4 Drawing Sheets

(56) References Cited

U.S. PATENT DOCUMENTS

| | | | |
|---|---|---|---|
| 2015/0331264 A1* | 11/2015 | Min | G02F 1/009 349/88 |
| 2018/0059318 A1* | 3/2018 | Nichol | G02B 6/0028 |
| 2018/0246327 A1 | 8/2018 | Takagi et al. | |
| 2019/0353945 A1 | 11/2019 | Takahashi | |
| 2020/0033655 A1 | 1/2020 | Hirayama | |

FOREIGN PATENT DOCUMENTS

| | | | |
|---|---|---|---|
| JP | 2018-128566 A | 8/2018 | |
| JP | 2018-141826 A | 9/2018 | |
| JP | 2020-93714 A | 6/2020 | |
| WO | WO-2004055578 A1 * | 7/2004 | G02F 1/1334 |
| WO | WO 2018/143401 A1 | 8/2018 | |
| WO | WO 2018/186447 A1 | 10/2018 | |

OTHER PUBLICATIONS

Instantaneous Dimming Sheet "Um Film" (with English translation), Exhibit No. 4, 2002, NSG, 3 pages.

"Function of UMU Film" (with English translation), Exhibit No. 5, 2002, NSG, 3 pages.

Kasmy-film—Application (with English translation), retrieved on Apr. 26, 2021, Exhibit No. 6, 4 pages.

Kasmy-film—Company (with English translation), retrieved on Apr. 26, 2021, Exhibit No. 7, 5 pages.

"Basic principle of new high-performance liquid film" (with English translation), Exhibit No. 9, NANO Kyusyu NONOTEC Optics, 2021, 4 pages.

Exhibit No. 10, NANO Kyusyu NONOTEC Optics, 2021, (with English translation) 5 pages.

"Characteristics of high-performance film sheets and their superiority" (with English translation), Exhibit No. 11, NANO Kyusyu NONOTEC Optics, 2021, 2 pages.

Experimental report (with English translation), IPJ Co., Ltd., Exhibit No. 12, Mar. 19, 2021, 16 pages.

International Search Report dated Jun. 9, 2020 in PCT/JP2020/011952, filed Mar. 18, 2020, 5 pages (with English Translation).

Japanese Office Action dated Dec. 10, 2019 in Japanese Patent Application No. 2019-051307 (with English translation), 6 pages.

Statement of Opposition dated Apr. 26, 2021 in Japanese Patent Application No. 2019-051307, 25 pages.

"Structure and principle of Umm film" (with English translation), NSG, 2002, Exhibit No. 1, 3 pages.

"History of technological development" (with English translation), NSG 2002, Exhibit No. 2, 2 pages.

* cited by examiner

LIGHT CONTROL SHEET, LIGHT CONTROL DEVICE AND METHOD OF CONTROLLING THE LIGHT CONTROL SHEET

CROSS-REFERENCE TO RELATED APPLICATIONS

The present application is a continuation of International Application No. PCT/JP2020/011952, filed Mar. 18, 2020, which is based upon and claims the benefits of priority to Japanese Application No. 2019-051307, filed Mar. 19, 2019. The entire contents of all of the above applications are incorporated herein by reference.

BACKGROUND OF THE INVENTION

Field of the Invention

The present invention relates to light control sheets, light control devices including light control sheets, and methods of controlling light control sheets.

Discussion of the Background

Light control sheets typically include a light control layer and two transparent electrode layers sandwiching the light control layer (e.g., see JP 2017-187775 A). Light control devices include the above light control sheet and a control unit that controls a drive voltage applied to the two transparent electrode layers. Depending on the potential difference between the two transparent electrode layers, the alignment state of liquid crystal molecules contained in the light control layer changes, for example, so that transparency of the light control sheet is changed. The control unit switches the state of the light control sheet between a transparent state and an opaque state by changing the drive voltage applied to the transparent electrode layers.

SUMMARY OF THE INVENTION

According to an aspect of the present invention, a light control sheet includes a light control layer and transparent electrode layers sandwiching the light control layer such that the transparent electrode layers apply a voltage to the light control layer. The light control layer has a light-shielding property which changes based on the voltage applied to the transparent electrode layers and is measurable by a light-shielding ratio defined by JIS L 1055:2009, and at least one target change ratio has a maximum value of 0.7 or more in an absolute value, where the target change ratio is a change ratio of the light-shielding ratio with respect to the voltage in a target range of the voltage in which the light-shielding ratio changes by 10%.

According to another aspect of the present invention, a method of controlling a light control sheet includes detecting whether the light control sheet satisfies a condition; and determining that the light control sheet is operational if the light control sheet satisfies the condition. The light control sheet includes a light control layer and transparent electrode layers sandwiching the light control layer such that the transparent electrode layers apply a voltage to the light control layer, the light control layer has a light-shielding property which changes based on a voltage applied to the transparent electrode layers and is measurable by a light-shielding ratio defined by JIS L 1055:2009, and the condition is that at least one target change ratio has a maximum value of 0.7 or more in an absolute value, where the target change ratio is a change ratio of the light-shielding ratio with respect to the voltage in a target range of the voltage in which the light-shielding ratio changes by 10%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
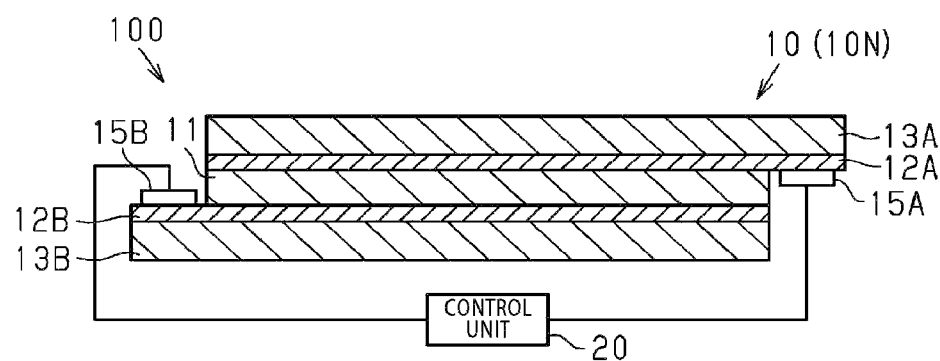
FIG. 1 is a diagram illustrating a structure of a light control device provided with a normal type light control sheet, according to an embodiment of a light control device.

The embodiments will now be described with reference to the accompanying drawings, wherein like reference numerals designate corresponding or identical elements throughout the various drawings.

Referring to the drawings, an embodiment of a light control sheet, a light control device, and a method of controlling the light control sheet will be described.

<Basic Structure of Light Control Device>

Figure 2:
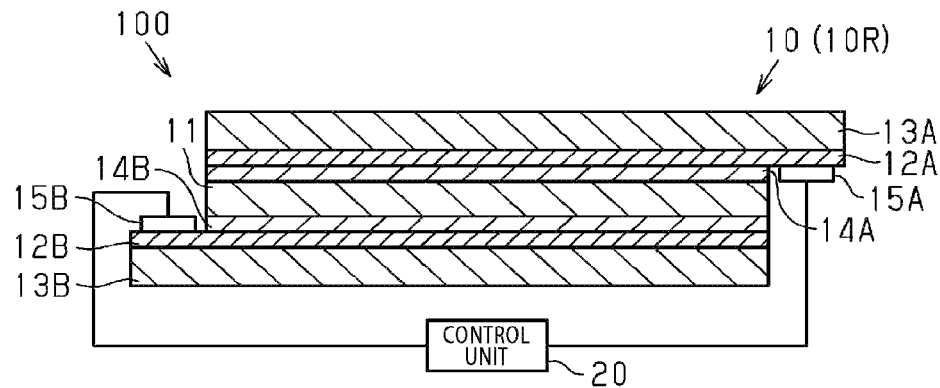
FIG. 2 is a diagram illustrating a structure of a light control device provided with a reverse type light control sheet, according to an embodiment of a light control device.

Referring to FIGS. 1 and 2, a basic structure of the light control device will be described, focusing on the structure of the light control sheet provided to the light control device.

FIG. 1 shows a light control device 100 including a light control sheet 10 and a control unit 20 that controls a drive voltage applied to the light control sheet 10. The light control sheet 10 has either a normal type structure or a reverse type structure. FIG. 1 shows a cross-sectional structure of a normal type light control sheet 10N.

The normal type light control sheet 10N includes a light control layer 11, two transparent electrode layers, i.e., a first transparent electrode layer 12A and a second transparent electrode layer 12B, and two transparent support layers, i.e., a first transparent support layer 13A and a second transparent support layer 13B. The first and second transparent electrode layers 12A and 12B sandwich the light control layer 11, and the first and second transparent support layers 13A and 13B sandwich the light control layer 11 and the transparent electrode layers 12A and 12B. The first transparent support layer 13A supports the first transparent electrode layer 12A, while the second transparent support layer 13B supports the second transparent electrode layer 12B.

The first transparent electrode layer 12A has a surface to which a first terminal 15A is connected. The first transparent electrode layer 12A is connected to the control unit 20 via a wiring extending from the first terminal 15A. The second transparent electrode layer 12B has a surface to which a second terminal 15B is connected. The second transparent electrode layer 12B is connected to the control unit 20 via a wiring extending from the second terminal 15B. At an end of the light control sheet 10N, the first transparent electrode 12A is exposed from the light control layer 11, the second transparent electrode layer 12B, and the second transparent support layer 13B. The first terminal 15A is disposed in the exposed region of the first transparent electrode layer 12A. At an end of the light control sheet 10N, the second transparent electrode layer 12B is exposed from the light control layer 11, the first transparent electrode layer 12A, and the first transparent support layer 13A. The second terminal 15B is disposed in the exposed region of the second transparent electrode layer 12B. The terminals 15A and 15B form a part of the light control sheet 10N.

The control unit 20 generates a drive voltage, which is an alternating voltage, and applies the drive voltage to the first and second transparent electrode layers 12A and 12B.

The light control layer 11 contains a liquid crystal composition. The liquid crystal composition contains liquid crystal molecules. The light control layer 11 is composed of, for example, a polymer network liquid crystal (PNLC), a polymer dispersed liquid crystal (PDLC), a nematic curvilinear aligned phase (NCAP) liquid crystal, or the like. For example, the polymer network liquid crystal has a three-dimensional mesh polymer network, and holds liquid crystal molecules in voids of the polymer network. The liquid crystal molecules contained in the light control layer 11 have, for example, positive dielectric anisotropy, and have a higher dielectric constant in a major axis direction than in a minor axis direction of the liquid crystal molecules. It should be noted that the light control layer 11 may contain a dye that has a predetermined color and does not interfere with the movement of the liquid crystal molecules. Such a configuration can provide a light control sheet 10 having a predetermined color.

The first and second transparent electrode layers 12A and 12B each serve as an electrically conductive transparent layer. The material forming the transparent electrode layers 12A and 12B may be, for example, indium tin oxide (ITO), fluorine doped tin oxide (FTO), tin oxide, zinc oxide, carbon nanotubes (CNT), a polymer containing poly(3,4-ethylenedioxythiophene) (PEDOT), or the like. The transparent electrode layers 12A and 12B may each be a multilayer film containing an Ag alloy film.

The first and second transparent support layers 13A and 13B are transparent substrates. The first and second transparent support layers 13A and 13B may each be, for example, a glass substrate, silicon substrate, polymer film, or the like. Materials forming the polymer film may include, for example, polyethylenes, polystyrenes, polyethylene terephthalate, polyvinyl alcohols, polycarbonates, polyvinyl chlorides, polyimides, polysulfones, cyclo-olefin polymer, triacetyl cellulose, and the like.

The first and second terminals 15A and 15B may each be formed of, for example, an electrically conductive adhesive layer, wiring substrate, lead wire, or the like. The electrically conductive adhesive layer may be, for example, a metal tape, electrically conductive film, electrically conductive paste, or the like. The wiring substrate may be, for example, a flexible printed circuit (FPC), or the like.

FIG. 2 shows a cross-sectional structure of a reverse type light control sheet 10R. In addition to the light control layer 11, the transparent electrode layers 12A and 12B, and the transparent support layers 13A and 13B, the reverse type light control sheet 10R includes two alignment layers, i.e., a first alignment layer 14A and a second alignment layer 14B, sandwiching the light control layer 11. The first alignment layer 14A is disposed between the light control layer 11 and the first transparent electrode layer 12A, and the second alignment layer 14B is disposed between the light control layer 11 and the second transparent electrode layer 12B. In other words, the first and second transparent electrode layers 12A and 12B sandwich therebetween the light control layer 11 and the alignment layers 14A and 14B.

The alignment layers 14A and 14B may be, for example, vertical alignment films. When the first and second transparent electrode layers 12A and 12B have the same potential, the alignment layers 14A and 14B align the major axis direction of the liquid crystal molecules contained in the light control layer 11 to a direction normal to a plane in which the alignment layers 14A and 14B extend. When there is a potential difference between the transparent electrode layers 12A and 12B, the alignment layers 14A and 14B can change the major axis direction of the liquid crystal molecules contained in the light control layer 11 to a direction other than the above normal direction.

Materials forming the alignment layers 14A and 14B may include, for example, polyamides, polyimides, polycarbonates, polystyrenes, polysiloxanes, polyesters, and polyacrylates. The polyesters may be, for example, polyethylene terephthalate, polyethylene naphthalate, or the like. The polyacrylates may be, for example, polymethylmethacrylate, or the like. The alignment layers 14A and 14B may be subjected to, for example, rubbing, polarized light irradiation, or microfabrication so that they can serve as vertical alignment films.

In the normal type light control sheet, the major axes of the liquid crystal molecules are irregularly oriented under conditions in which no drive voltage is applied to the transparent electrode layers 12A and 12B, i.e., under conditions in which the potential of the first transparent electrode layer 12A is equal to the potential of the second transparent electrode layer 12B. Therefore, light incident on the light control layer 11 is scattered and the light control sheet 10 becomes opaque. In a state where a drive voltage is applied to the first and second transparent electrode layers 12A and 12B and there is a potential difference between these transparent electrode layers 12A and 12B, the liquid crystal molecules are aligned according to the potential difference and the major axes of the liquid crystal molecules are oriented in the direction of an electric field between the transparent electrode layers 12A and 12B. Consequently, light is transmitted more easily through the light control layer 11. As the applied drive voltage increases in a predetermined range, transparency of the light control sheet 10 increases.

In a reverse type light control sheet, liquid crystal molecules are aligned by the alignment layers 14A and 14B in a state where no drive voltage is applied to the transparent electrode layers 12A and 12B, so that the major axes of the liquid crystal molecules are oriented in the direction normal to the plane in which the alignment layers 14A and 14B extend. Consequently, the light control sheet 10 becomes transparent. In a state where a drive voltage is applied to the first and second transparent electrode layers 12A and 12B, the major axes of the liquid crystal molecules are deviated from the above normal direction according to the potential difference between these transparent electrode layers 12A and 12B, and accordingly light is less likely to be transmitted through the light control layer 11. As the applied drive voltage increases in a predetermined range, transparency of the light control sheet 10 decreases.

<Light-Shielding Ratio>

The light control sheet 10 is attached to a transparent member located between two spaces. Thus, the light control sheet 10 serves as a partition capable of controlling light-shielding properties of the two spaces. The surface on which the light control sheet 10 is attached may be flat or curved. For example, the light control sheet 10 may be attached to building materials or vehicle materials. The building materials may include, for example, window glass, partitions, and glass walls. The vehicle materials may include, for example, window glass of vehicles.

In order that the light control sheet 10 can arbitrarily control brightness of a space partitioned by the light control sheet 10, light-shielding properties of the light control sheet 10 may only have to be changed by switching the state of the light control sheet 10 between a first state and a second state under control of the drive voltage. The second state is a state which is clearly different from the first state.

In general, transparency of light control sheets 10 is evaluated based on haze that indicates a degree of light diffusion in the light control sheets 10. On the other hand, the light-shielding properties of the light control sheet 10 are related to how much light passes through the light control sheet 10 from a first space to illuminate a second space, without distinguishing between parallel light and diffused light. Depending on haze, accurate evaluation of light-shielding properties is difficult. For example, in a diffusion state of a given level or more, sensitivity of light-shielding properties to haze may be reduced. Therefore, variation in haze of the light control sheet with respect to variation in drive voltage does not necessarily completely match the variation in light-shielding ratio. In this regard, the inventor of the present invention found that the function of brightness control of a light control sheet 10 could be evaluated by evaluating the light-shielding properties of the light control sheet 10 using the light-shielding ratio prescribed in JIS L 1055:2009 (method A).

The inventor of the present invention studied test examples of the light control sheet 10 and found that the difference in the light-shielding properties of a light control sheet 10 could be perceived by an observer if the light-shielding ratio is different by 10% or more. Specifically, if the difference in the light-shielding ratio of a light control sheet 10 between the first state and the second state is 10% or more, brightness change in a space due to switching between the first and second states can be perceived by an observer present in the space.

The first state is a state in which the light-shielding ratio of the light control sheet 10 is maximum in a predetermined range of the drive voltage. The second state is a state in which the light-shielding ratio of the light control sheet 10 is minimum in the predetermined range of the drive voltage. The control unit 20 may switch the state of the light control sheet 10 between two states, i.e., the first state and the second state, or may switch the state between three or more states including the first state, the second state, and an intermediate state in which the light-shielding ratio is intermediate between the first and second states. In the light control sheet 10, transparency is higher in the second state than in the first state.

The inventor of the present invention evaluated the speed of change in the light-shielding ratio, i.e., the speed of brightness change caused by the light control sheet 10, by analyzing the relationship between drive voltage and light-shielding ratio. This will be described below in detail.

Figure 3:
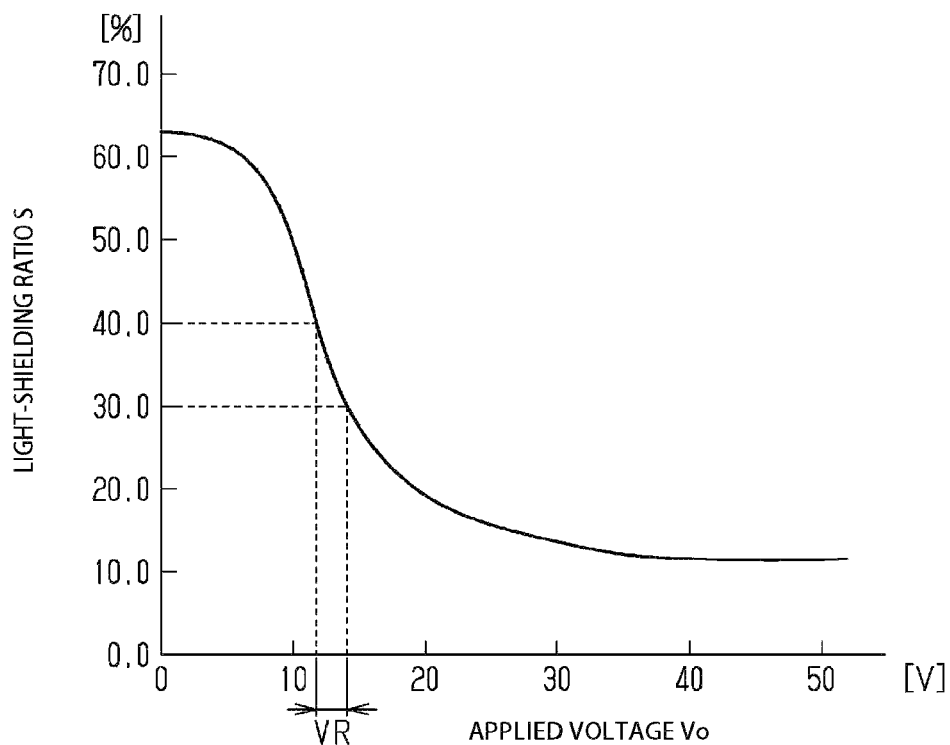
FIG. 3 is a graph showing a standard relationship between applied voltage and light-shielding ratio in a light control sheet.

FIG. 3 shows a standard relationship between drive voltage and light-shielding ratio in the normal type light control sheet 10N, obtained as a result of the above analysis. As shown in FIG. 3, the light-shielding ratio S is maximum when the drive voltage, as an applied voltage Vo, applied to the transparent electrode layers 12A and 12B is 0 V. When increasing the applied voltage Vo from 0 V, the light-shielding ratio S moderately decreases with the increase of the applied voltage Vo in a period in which the applied voltage Vo is small. From when the applied voltage Vo reaches around an intermediate level, the light-shielding ratio S decreases rapidly with increase of the applied voltage Vo. When the applied voltage Vo has further increased, the light-shielding ratio S decreases moderately with increase of the applied voltage Vo. From when the applied voltage Vo reaches a predetermined level or more, change in the light-shielding ratio S is mitigated and the light-shielding ratio S comes to remain almost unchanged.

The range of applied voltage Vo in which the light-shielding ratio S changes by 10% is defined to be a target range VR, and the ratio of change in the light-shielding ratio S [%] with respect to the applied voltage Vo [V], i.e., the amount of change in the light-shielding ratio S per 1 V-increase of the applied voltage Vo, in the target range VR is defined to be a target change ratio RC. Specifically, when the lower limit of the applied voltage Vo in the target range VR is V1 and the upper limit of the applied voltage Vo in the target range VR is V2, an absolute value |RC| of the target change ratio RC in a normal mode can be calculated from the following formula.

$$|RC|=|-10|/(V2-V1)$$

FIG. 3 shows one target range VR as an example.

As described above, brightness change in a space can be perceived by an observer present in the space if the light-shielding ratio S changes by 10% or more. The target change ratio RC indicates a ratio of change in the light-shielding ratio S with respect to the applied voltage Vo in the case where the light-shielding ratio S of the light control sheet 10 changes to an extent that the brightness change can be perceived by an observer.

The inventor of the present invention studied test examples of the light control sheet 10 and found that, if the maximum value of the absolute value of the target change ratio RC is 0.7 or more in the range of applied voltage applied to the transparent electrode layers 12A and 12B, the speed of change in the light-shielding ratio was sufficiently high that the timing of the brightness change could be perceived by an observer. For example, if the first state is realized with a drive voltage of 0 V and the second state is realized with a drive voltage of 50 V, a maximum value of the absolute value of the target change ratio RC in the target ranges VR included in the range of 0 V or more and 50 V or less may only have to be 0.7 or more.

In a reverse type light control sheet 10R, the direction of increase/decrease in the light-shielding ratio S with respect to increase/decrease of the applied voltage Vo is reversed from the normal type. Specifically, when the applied voltage Vo is 0 V, the light-shielding ratio S is minimum, and when the applied voltage Vo is increased from 0 V, the light-shielding ratio S moderately increases with the increase of the applied voltage Vo in a period in which the applied voltage Vo is small. From when the applied voltage Vo reaches an intermediate level, the light-shielding ratio S increases rapidly with increase of the applied voltage Vo. When the applied voltage Vo further increases, the light-shielding ratio S increases moderately with increase of the applied voltage Vo. From when the applied voltage Vo reaches a predetermined level or more, change in the light-shielding ratio S is mitigated and the light-shielding ratio S comes to remain almost unchanged.

In the reverse type also, the range of applied voltage Vo in which the light-shielding ratio S changes by 10% is defined to be a target range VR, and the ratio of change in the light-shielding ratio S [%] with respect to the applied voltage Vo [V] in the target range VR is defined to be a target change ratio RC. When the lower limit of the applied voltage Vo in the target range VR is V1 and the upper limit of the applied voltage Vo in the target range VR is V2, an absolute value of the target change ratio RC is calculated from the following formula.

$$|RC|=|10|/(V2-V1)$$

Also, in the reverse type, the speed of change in the light-shielding ratio is high as long as the maximum value of the absolute value of the target change ratio RC is 0.7 or more in the range of the drive voltage applied to the transparent electrode layers 12A and 12B.

Hereinafter, the test examples and the results of studies thereof are described in detail.

By changing the total thickness of the light control sheet 10 and the configuration of the light control layer 11, five test examples were obtained, in each of which the maximum value of the absolute value of the target change ratio RC was different from those of other test examples. The changed items in the configuration of the light control layer 11 of the test examples included the type and composition of the liquid crystal forming the light control layer 11, the density of polymers if they are contained in the light control layer 11, and the size of voids in a polymer network if the light control layer 11 is made of PNLC. The test examples were normal type light control sheets 10N.

The light-shielding ratio tends to have a smaller maximum value as the total thickness of the light control sheet 10 decreases, and to have a larger minimum value as the total thickness of the light control sheet 10 increases. In order to secure a sufficient difference in the light-shielding ratio between the maximum and minimum values thereof, i.e., a sufficient difference in the light-shielding ratio between the first and second states, the light control sheet 10 is preferred to have a total thickness of 40 µm or more and 400 µm or less. The transparent support layers 13A and 13B used in this case are each preferred to have a thickness of 20 µm or more and 200 µm or less and the light control layer 11 is preferred to have a thickness of 5 µm or more and 50 µm or less.

The light control sheet of Test Example 1 included a light control layer 11 made of PNLC, transparent electrode layers 12A and 12B made of ITO, and transparent support layers 13A and 13B made of polyethylene terephthalate. In Test Example 1, the light control sheet had a total thickness of 120 µm and the first and second transparent support layers 13A and 13B each had a thickness of 50 µm.

In Test Example 2, the total thickness of the light control layer 11 and the configuration of the light control layer 11 were different from Test Example 1. In Test Example 2, the light control sheet had a total thickness of 270 µm and the first and second transparent support layers 13A and 13B each had a thickness of 125 km.

In Test Example 3, the total thickness of the light control layer 11 and the configuration of the light control layer 11 were different from Test Example 1. In Test Example 3, the light control sheet had a total thickness of 400 µm and the first and second transparent support layers 13A and 13B each had a thickness of 188 µm.

In Test Example 4, the total thickness of the light control layer 11 and the configuration of the light control layer 11 were different from Test Example 1. In Test Example 4, the light control sheet had a total thickness of 400 µm and the first and second transparent support layers 13A and 13B each had a thickness of 188 km.

In Test Example 5, the total thickness of the light control layer 11 and the configuration of the light control layer 11 were different from Test Example 1. In Test Example 5, the light control sheet had a total thickness of 400 µm and the first and second transparent support layers 13A and 13B each had a thickness of 188 µm.

The light control sheet of Test Example 1 was disposed between two spaces, i.e., first and second spaces, and a white light source was disposed in the first space. Next, the light-shielding ratio was changed by changing the drive voltage applied between the transparent electrode layers 12A and 12B and brightness change in the second space was subjected to sensory evaluation. Consequently, it was confirmed that, if the light-shielding ratio was changed by 10%, brightness change could be perceived. Also, if the light-shielding ratio was changed by 50%, brightness change was more clearly recognizable.

Thus, it was confirmed that, if the difference in the light-shielding ratio of the light control sheet 10 between the first state and the second state was 10% or more, brightness of a space could be controlled by switching the state of the light control sheet 10 between the first and second states. Furthermore, it was confirmed that the difference in the light-shielding ratio between the first and second states of the light control sheet 10 was preferred to be 50% or more in order to make the difference in the light-shielding properties prominent between the first and second states and to enhance the function of brightness control in the space.

Further, when the light-shielding ratio was 30% or more, light was recognizably blocked by the light control sheet 10. Accordingly, the light-shielding ratio in the first state is preferred to be 30% or more.

Figure 4:
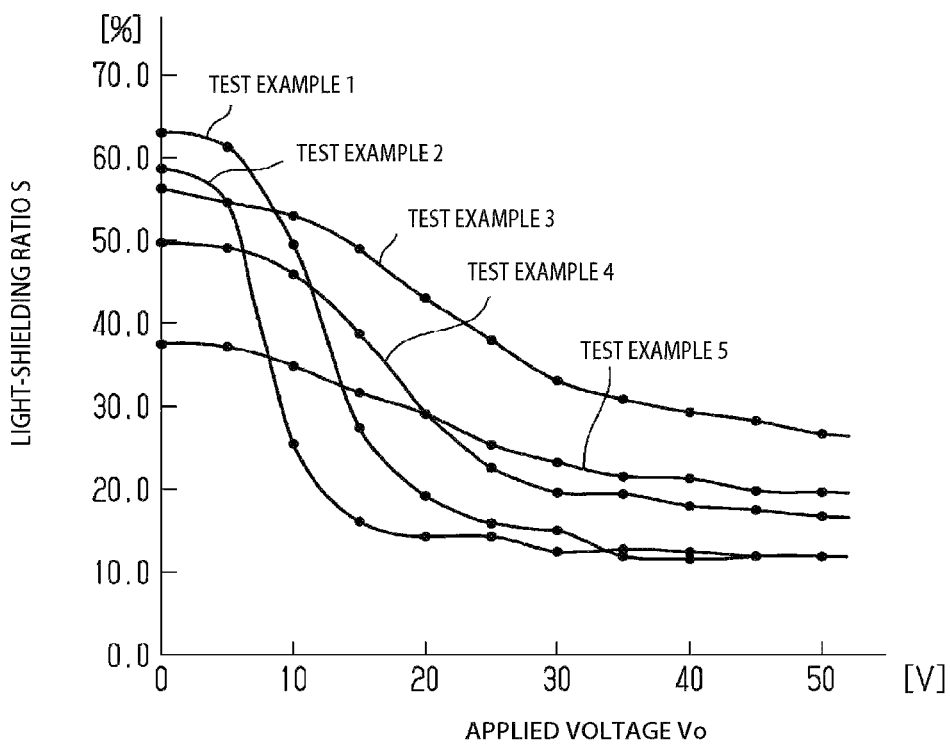
FIG. 4 is a graph showing relationships between applied voltage and light-shielding ratio in light control sheets according to respective test examples.

FIG. 4 shows the results of measurements performed for the test examples in terms of a relationship between the drive voltage applied between the transparent electrode layers 12A and 12B and light-shielding ratio. In each test example, the light-shielding ratio S was changed in 1% increments and a plurality of target ranges VR were set. Next, for each target range VR, the upper and lower limits of the applied voltage Vo were read from the graph to calculate a target change ratio RC. Next, a maximum value of the absolute value of the target change ratio RC was obtained.

In Test Example 1, it was confirmed that the absolute value of a target change ratio RC was maximized in the vicinity of the target ranges VR where the light-shielding ratio S changed from 44% to 34% and from 43% to 33%, i.e., when the applied voltage Vo was around 12 V. The maximum value of the absolute value of the target change ratio RC was confirmed to be approximately 5.3.

In Test Example 2, it was confirmed that the absolute value of a target change ratio RC was maximized in the vicinity of the target ranges VR where the light-shielding ratio S was in the range of 47% to 30%, i.e., when the applied voltage Vo was around 7 V to 8 V. The maximum value of the absolute value of the target change ratio RC was confirmed to be approximately 7.1.

In Test Example 3, it was confirmed that the absolute value of a target change ratio RC was maximized in the vicinity of the target ranges VR where the light-shielding ratio S was in the range of 51% to 34%, i.e., when the applied voltage Vo was around 15 V to 25 V. The maximum value of the absolute value of the target change ratio RC was confirmed to be approximately 1.0.

In Test Example 4, it was confirmed that the absolute value of a target change ratio RC was maximized in the vicinity of the target ranges VR where the light-shielding ratio S was in the range of 41% to 28%, i.e., when the applied voltage Vo was around 15 V to 20 V. The maximum value of the absolute value of the target change ratio RC was confirmed to be approximately 1.8.

In Test Example 5, it was confirmed that the absolute value of a target change ratio RC was maximized in the vicinity of the target ranges VR where the light-shielding ratio S was in the range of 36% to 24%, i.e., when the applied voltage Vo was around 10 V to 25 V. The maximum value of the absolute value of the target change ratio RC was confirmed to be approximately 0.6.

It was confirmed that, when the applied voltage Vo was gradually changed, the light-shielding ratios S of the light control sheets of the respective test examples changed as described by the curves shown in FIG. 4. This may mean that, if a predetermined drive voltage is applied to the light control sheets of the test examples to switch the state between the first and second states, the light-shielding ratios S of these test examples change rapidly with time as indicated by the curves in FIG. 4. The larger is the absolute value of the target change ratio RC, the faster may be the change of the light-shielding ratio, in a range of change ratio including the target change ratio RC, that is, the shorter the time will be that is required for the light-shielding ratio to change by 10% in this range. In other words, the larger is the absolute value of the target change ratio RC, the shorter the time may be required for the brightness to change recognizably.

Accordingly, a larger maximum value of the absolute value of the target change ratio RC can achieve a 10%-change in the light-shielding ratio more quickly in a period from when the control unit 20 instructs change in the drive voltage for switching the state between the first and second states until when the change in the light-shielding ratio completes. In other words, the light-shielding ratio changes more quickly in the period by an amount of brightness change that can be perceived by an observer. Consequently, the timing when the light control sheet 10 changes brightness can be easily perceived by an observer.

The light control sheet of each test example was disposed between two spaces, i.e., first and second spaces, and a white light source was disposed in the first space. Next, the drive voltage applied between the transparent electrode layers 12A and 12B was changed from 0 V to 50 V and brightness change in the second space was subjected to sensory evaluation. As a result of the evaluation, the timing of brightness change was less likely to be perceived for Test Example 5. In contrast, brightness change was perceived for Test Examples 1 to 4. In particular, for Test Examples 1 and 2, brightness seemed to change instantaneously.

Thus, it was confirmed that, when the maximum value of the absolute value of the target change ratio RC was 0.7 or more, the speed of change in the light-shielding ratio was sufficiently high. Also, it was confirmed that, when the maximum value of the absolute value of the target change ratio RC was 3.0 or more, the speed of change in the light-shielding ratio was particularly high.

The maximum value of the absolute value of the target change ratio RC is preferred to be 6.0 or less. In the light control sheet 10, the effective voltage applied to the light control layer 11 decreases as the distance from the terminals 15A and 15B increases. Accordingly, if the light-shielding ratio changes significantly within a narrow voltage range, the light-shielding ratio may vary in the plane of the light control sheet 10, and the light control sheet 10 may therefore be visually recognized as having uneven transparency in the plane. In particular, as the light control sheet 10 has a larger area, this problem may become more prominent. If the maximum value of the absolute value of the target change ratio RC is 6.0 or less, change in the light-shielding ratio can be suppressed in each target range VR so as not to be excessively rapid. In other words, the voltage range of each target range VR is prevented from becoming excessively small. Therefore, the occurrence of unevenness due to the difference in the light-shielding ratio can also be reduced or prevented if the light control sheet 10 is driven using an applied voltage in the vicinity of the target range VR having a maximum target change ratio RC.

Figure 5:
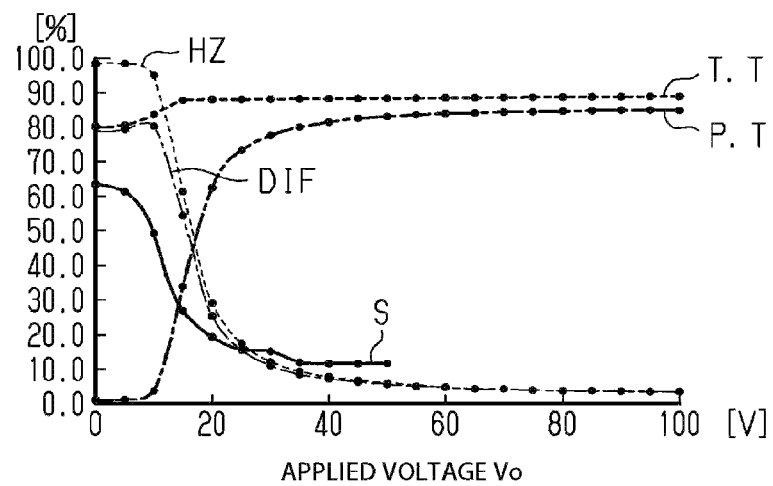
FIG. 5 is a graph showing relationships between applied voltage and parameters in a light control sheet according to Test Example 1.
Figure 6:
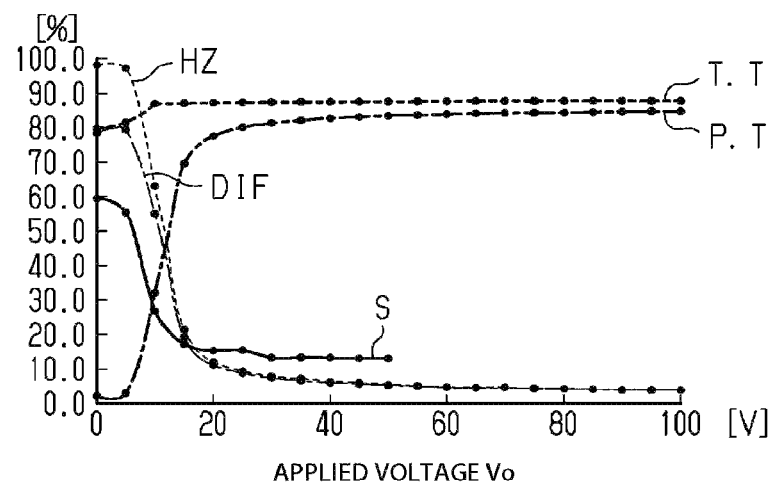
FIG. 6 is a graph showing relationships between applied voltage and parameters in a light control sheet according to Test Example 2.
Figure 7:
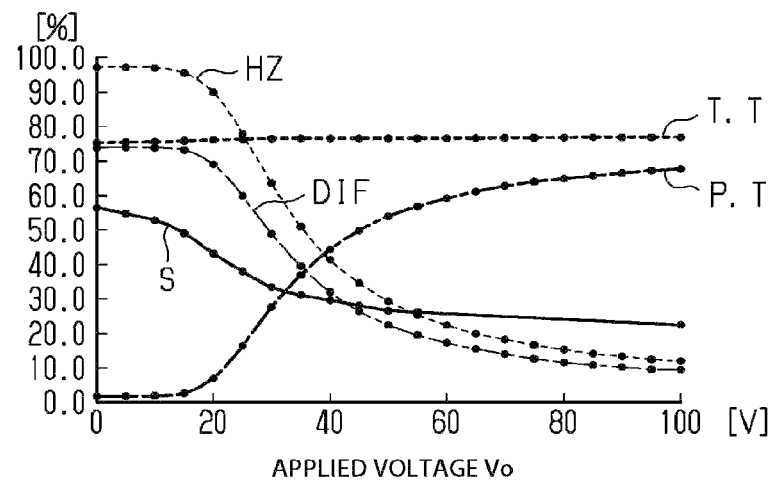
FIG. 7 is a graph showing relationships between applied voltage and parameters in a light control sheet according to Test Example 3.
Figure 8:
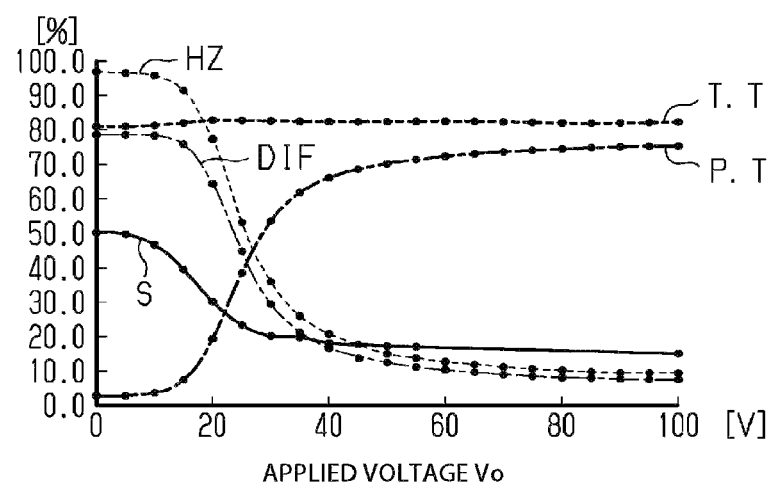
FIG. 8 is a graph showing relationships between applied voltage and parameters in a light control sheet according to Test Example 4.
Figure 9:
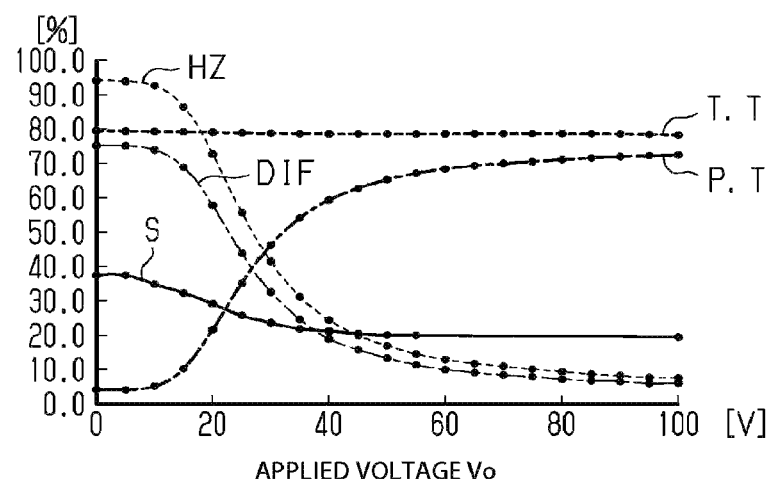
FIG. 9 is a graph showing relationships between applied voltage and parameters in a light control sheet according to Test Example 5.

Next, differences between the light-shielding ratio and other parameters were studied as described below. FIGS. 5 to 9 show the results of measurements performed for the test examples to show a relationship of drive voltage with light-shielding ratio, total light transmittance, parallel light transmittance, diffuse transmittance, and haze. The total light transmittance, parallel light transmittance, diffuse transmittance, and haze were measured according to JIS K 7361-1:1997 and JIS K 7136:2000. FIG. 5 shows the results of measurements for Test Example 1. FIG. 6 shows the results of measurements for Test Example 2. FIG. 7 shows the results of measurements for Test Example 3. FIG. 8 shows the results of measurements for Test Example 4. FIG. 9 shows the results of measurements for Test Example 5. In FIGS. 5 to 9, S indicates light-shielding ratio, T.T indicates total light transmittance, P.T indicates parallel light transmittance, DIF indicates diffuse transmittance, and HZ indicates haze.

As can be seen from FIGS. 5 to 9, the form of change in the light-shielding ratio with respect to the applied voltage Vo is different from the forms of change in parameters of total light transmittance, parallel light transmittance, diffuse transmittance, and haze. Specifically, total light transmittance and diffuse transmittance are parameters used for calculating a haze, and parallel light transmittance and diffuse transmittance are components of total light transmittance. Therefore, changes in these parameters are linked. Comparison of these parameters with light-shielding ratio shows that there is a difference in the level of the applied voltage Vo causing a change in the change ratio, or there is a difference in the range of the applied voltage Vo causing a large change in the change ratio. For example, light-shielding ratio and haze both decrease with the increase of the applied voltage; however, the amount of change in the light-shielding ratio in a low voltage range is greater than the amount of change in haze in the low voltage range. In other words, light-shielding ratio starts decreasing even in the low voltage range in which the maximum value of haze remains almost unchanged.

Thus, there is a great significance in using light-shielding ratio, which is a parameter measured with a method suitable for an object to be evaluated, to evaluate the function of brightness control of a light control sheet 10, i.e., to evaluate light-shielding properties of a light control sheet 10, instead of using haze or the like that has been used for evaluating transparency of light control sheets 10.

In the test examples, clarity was measured in a state in which the drive voltage was 0 V. Clarity is a parameter for evaluating the state of a light control sheet 10 using narrow-angle scattered light, and is measured using an integrating-sphere type light transmittance measurement device which is the same device as when used for measuring the above haze. Clarity can be used for evaluating the degree of sharpness of very small portions of an object observed via a light control sheet 10. As the clarity of a light control sheet 10 decreases, sharpness of an object observed via the light control sheet 10 decreases.

Clarity can be calculated from the following Formula (1), where IC is an amount of light advancing along the light axis of parallel light incident on a test specimen of a light control sheet disposed between a light source and an integrating sphere, among light that has transmitted through the light control sheet, and IR is an amount of narrow-angle scattered light having an angle within ±2.5° with respect to the light axis of the parallel light.

$$100 \times (IC-IR)/(IC+IR) \tag{1}$$

As a result of the measurements, clarity was 46.0% in Test Example 1, 51.8% in Test Example 2, 7.4% in Test Example 3, 39.9% in Test Example 4, and 9.7% in Test Example 5.

From these results, it is understood that the light control sheet of Test Example 1 not only has an excellent brightness control function, but also has an excellent function of hiding objects located behind the light control sheet. Therefore, the light control sheet of Test Example 1 is highly useful as a partition.

<Method of Controlling Light Control Sheet>

The method of controlling a light control sheet is used, for example, when producing light control sheets. In the method of controlling a light control sheet, it is determined whether the light control sheet is functioning normally. Requirement 1 as a requirement for determining a light control sheet to be functioning normally includes that the maximum value of the absolute value of the target change ratio RC is 0.7 or more.

If the method of controlling a light control sheet is used for producing light control sheets, the method of producing a light control sheet may include forming a light control sheet, measuring the light-shielding ratio of the light control sheet, with the level of the drive voltage being changed, to calculate a maximum value of the absolute value of the target change ratio RC, and determining the light control sheet to be functioning normally when the maximum value of the absolute value of the target change ratio RC of the light control sheet satisfies Requirement 1.

This production method can provide a light control sheet 10 having a function of brightness control for a space and allowing an observer to easily perceive the timing of brightness change.

Requirement 1 for determining a light control sheet to be functioning normally may include an upper limit of the maximum value of the absolute value of the target change ratio RC, and a lower limit of the difference in the light-shielding ratio between the first and second states described above.

According to the above embodiment, the following advantageous effects can be obtained.

(1) Since the maximum value of the absolute value of the target change ratio is 0.7 or more, the timing when brightness is changed by the light control sheet 10 can be easily perceived by an observer. This can achieve a light control sheet 10 which has a function of brightness control and can clearly indicate this function to an observer.

(2) If the maximum value of the absolute value of the target change ratio RC is 6.0 or less, the voltage range in which the light-shielding ratio changes by 10% can be prevented from being excessively narrowed. Therefore, even when voltage drop occurs as the light control sheet 10 becomes larger, perceptible differences in the light-shielding ratio are prevented from occurring in the plane of the light control sheet 10. Consequently, unevenness occurring in the light control sheet 10 is prevented from being visually recognized.

(3) If the light-shielding ratio in the first state of the light control sheet 10, i.e., the maximum light-shielding ratio of the light control sheet 10 in a state in which a predetermined drive voltage is applied, is 30% or more, light-shielding properties of the light control sheet 10 in the first state can be sufficiently ensured. Accordingly, there is provided a light control sheet 10 having excellent light-shielding properties.

(4) The difference in the light-shielding ratio between the first state and the second state of the light control sheet 10 is 50% or more. In other words, the light control sheet 10 is configured so that it can change light-shielding ratio by 50% or more by application of a drive voltage. With this configuration, brightness of a space can be changed to a greater extent by switching the state between the first state and the second state. This can enhance the function of brightness control performed by the light control sheet 10.

(5) If the light control layer 11 is configured to include a polymer network liquid crystal or a polymer dispersed liquid crystal, there can be easily provided a light control sheet in which the difference between the maximum value and the minimum value of the light-shielding ratio is large, and the maximum value of the absolute value of the target change ratio RC is large.

(6) According to the method of controlling a light control sheet using Requirement 1 as a requirement for determining a light control sheet 10 to be functioning normally, quality control can be performed for light control sheets 10 in terms of light-shielding properties. This control method can produce a light control sheet 10 having a function of brightness control for a space and allowing an observer to easily perceive the timing of brightness change.

(Modification)

The above embodiment can be implemented with modifications as described below.

As described above, the control unit 20 of the light control device 100 may switch the state of the light control sheet 10 between two states, i.e., the first state and the second state, or may switch the state between three or more states including the first state, the second state, and an intermediate state in which the light-shielding ratio is intermediate between the first and second states. When the control unit 20 applies a drive voltage of not less than an upper limit of a target range VR in which the absolute value of the target change ratio RC is maximum, there can be achieved a light control device 100 having a light control sheet 10 that has a function of brightness control for a space and easily allows an observer to perceive the timing of brightness change.

If the state of the light control sheet 10 is switched between three or more states, the control unit 20 may include, for example, information such as a table based on which light-shielding ratios different from each other can be converted to respective drive voltages, or may apply a drive voltage, which is correlated to a light-shielding ratio specified by an external operating device or the like, to the light control sheet 10.

In the plurality of states of the light control sheet 10, the light-shielding ratio of each state is preferred to be different from the light-shielding ratios of other states by 10% or more. With this configuration, each time the state of the light control sheet 10 is changed, brightness change can be perceived by an observer. Accordingly, brightness of a space can be switched in multiple stages by the light control device 100 to thereby enhance the function of brightness control.

The light control sheet 10 in the first state may be used as a screen on which an image is projected. As the light control sheet 10 increases light-shielding ratio in the first state, light used for projection can be prevented more strongly from being transmitted therethrough. Thus, the light control sheet 10 can serve as a screen capable of providing a clear image.

The present application addresses the following. Light control sheets may be attached to, for example, the window glass of buildings or automobiles, for use as partitions separating two spaces from each other. For the purpose of protecting privacy or for other purposes, such a light control sheet is required to make persons or objects present in a first space invisible from observers present in a second space when the light control sheet is in an opaque state.

Light control sheets serving as partitions are desired to have some properties from other perspectives than transparency. Specifically, such a light control sheet is required to be capable of changing the amount of light entering a second space from a first space and controlling brightness in the second space. To clearly indicate to an observer in the second space that the light control sheet is capable of controlling brightness, it is preferred that the timing of brightness change is easily perceived by the observer, i.e., it is preferred that the brightness changes in a short time.

The present invention aims to provide a light control sheet capable of controlling brightness of a space, a light control device, and a method of controlling the light control sheet.

A light control sheet for solving the above issue includes a light control layer and two transparent electrode layers sandwiching the light control layer. Absolute values of one or more target change ratios have a maximum value of 0.7 or more, each target change ratio being a change ratio of a light-shielding ratio [%] with respect to an applied voltage [V] in a target range, the target range being a range of the applied voltage in which a light-shielding ratio of the light control sheet changes by 10%, the light-shielding ratio being prescribed by JIS L 1055:2009.

As the maximum value of the absolute value of the target change ratio increases, the light-shielding ratio changes by 10% faster at any time from the instruction to change the applied voltage to the completion of the change in the light-shielding ratio. In other words, the light-shielding ratio changes faster at the above point in time by an amount of change by which the change of brightness in the space can be perceived by an observer. If the maximum value of the absolute value of the target change ratio is 0.7 or more, the speed of change in the light-shielding ratio at the above point in time is high, and the timing of the change of brightness can be easily perceived by an observer. This can achieve a light control sheet having a function of brightness control and capable of clearly indicating this function to an observer.

A method of controlling a light control sheet for solving the above issue is a method of controlling a light control sheet that includes a light control layer and two transparent electrode layers sandwiching the light control layer, and has a configuration capable of changing a light-shielding ratio prescribed by JIS L 1055:2009 by applying a voltage to the two transparent electrode layers. The control method includes determining whether the light control sheet is functioning normally. In the method, a requirement for determining the light control sheet to be functioning normally is that, under conditions in which an applied voltage applied to the transparent electrode layers is changed, absolute values of one or more target change ratios have a maximum absolute value of 0.7 or more, each target change ratio being a change ratio of a light-shielding ratio [%] with respect to an applied voltage [V] in a target range, the target range being a range of the applied voltage in which a light-shielding ratio of the light control sheet changes by 10%.

The above control method can control qualities of the light control sheet in terms of light-shielding properties, and use of this control method can produce a light control sheet having a function of controlling brightness of a space and allowing an observer to easily perceive the timing of the change of brightness.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
   a light control layer;
   a plurality of transparent electrode layers sandwiching the light control layer such that the transparent electrode layers apply a voltage to the light control layer; and
   a control unit comprising circuitry configured to detect whether the light control sheet satisfies a condition, determine that the light control sheet is operational if the light control sheet satisfies the condition, and apply the voltage to the transparent electrode layers,
   wherein the light control layer has a light-shielding property which changes based on the voltage applied to the transparent electrode layers and is measurable by a light-shielding ratio defined by JIS L 1055:2009, and the condition is that the light control sheet is configured to have at least one target change ratio having a maximum value in a range of 0.7 to 6.0 in an absolute value, where the target change ratio is a change ratio of the light-shielding ratio with respect to the voltage in a target range of the voltage in which the light-shielding ratio changes by 10%.

2. The light control sheet according to claim 1, wherein the target change ratio has the maximum value in a range of 3.0 to 6.0 in the absolute value.

3. The light control sheet according to claim 1, wherein the light-shielding ratio has a maximum value of 30% or more.

4. The light control sheet according to claim 1, wherein the light control sheet is configured such that the light-shielding ratio changes by 50% or more based on the voltage applied to the transparent electrode layers.

5. The light control sheet according to claim 1, wherein the light control layer includes a polymer network liquid crystal or a polymer dispersed liquid crystal.

6. A light control device, comprising:
   the light control sheet of claim 1; and
   a control unit comprising circuitry configured to control the voltage applied to the transparent electrode layers.

7. The light control device according to claim 6, wherein the circuitry of the control unit is configured to change the voltage and switch the light control sheet from a first state to a second state where the light-shielding ratio of the light control sheet in the first state differs from the light-shielding ratio in the second state by 10% or more.

8. A method of controlling a light control sheet, comprising:
   detecting whether the light control sheet satisfies a condition;
   determining that the light control sheet is operational if the light control sheet satisfies the condition; and
   applying a voltage to a plurality of transparent electrode layers of the light control sheet such that the transparent electrode layers applies the voltage to a light control layer of the light control sheet sandwiched between the transparent electrode layers,
   wherein the light control layer has a light-shielding property which changes based on a voltage applied to the transparent electrode layers and is measurable by a light-shielding ratio defined by JIS L 1055:2009, and the condition is that the light control sheet is configured to have at least one target change ratio having a maximum value in a range of 0.7 to 6.0 in an absolute value, where the target change ratio is a change ratio of the light-shielding ratio with respect to the voltage in a target range of the voltage in which the light-shielding ratio changes by 10%.

9. The light control sheet according to claim 2, wherein the light-shielding ratio has a maximum value of 30% or more.

10. The light control sheet according to claim 2, wherein the light control sheet is configured such that the light-shielding ratio changes by 50% or more based on the voltage applied to the transparent electrode layers.

11. The light control sheet according to claim 2, wherein the light control layer includes a polymer network liquid crystal or a polymer dispersed liquid crystal.

12. The light control sheet according to claim 3, wherein the light control sheet is configured such that the light-shielding ratio changes by 50% or more based on the voltage applied to the transparent electrode layers.

13. The light control sheet according to claim 3, wherein the light control layer includes a polymer network liquid crystal or a polymer dispersed liquid crystal.

14. The light control sheet according to claim 4, wherein the light control layer includes a polymer network liquid crystal or a polymer dispersed liquid crystal.

15. The method of claim 8, wherein the target change ratio has the maximum value in a range of 3.0 to 6.0 in the absolute value.

16. The method of claim 8, wherein the light-shielding ratio has a maximum value of 30% or more.

17. The method of claim 8, wherein the light control sheet is configured such that the light-shielding ratio changes by 50% or more based on the voltage applied to the transparent electrode layers.

18. The method of claim 8, wherein the light control layer includes a polymer network liquid crystal or a polymer dispersed liquid crystal.

19. The method of claim 15, wherein the light-shielding ratio has a maximum value of 30% or more.

20. The method of claim 15, wherein the light control sheet is configured such that the light-shielding ratio changes by 50% or more based on the voltage applied to the transparent electrode layers.

* * * * *